United States Patent

[11] 3,585,753

| [72] | Inventor | Leonard R. Purdy |
| | | Oakwood, Ga. |
| [21] | Appl. No. | 32,800 |
| [22] | Filed | Apr. 29, 1970 |
| [45] | Patented | June 22, 1971 |
| [73] | Assignee | Lanier Industries, Inc. |
| | | Oakwood, Ga. |

[54] FUSELAGE CONSTRUCTION FOR MODEL AIRCRAFT
7 Claims, 6 Drawing Figs.

[52] U.S. Cl. ..................................................... 46/76 R, 46/78
[51] Int. Cl. ....................................................... A63h 27/02
[50] Field of Search ............................................ 46/76, 78

[56] References Cited
UNITED STATES PATENTS

| 2,870,569 | 1/1959 | Bergstrand .................. | 46/76 R (X) |
| 2,917,865 | 12/1959 | Bergstrand .................. | 46/76 R |
| 2,920,682 | 1/1960 | Linberg ...................... | 46/76 R (X) |
| 3,045,391 | 7/1962 | Stanzel ........................ | 46/78 |

*Primary Examiner*—Louis G. Mancene
*Assistant Examiner*—Robert F. Cutting
*Attorney*—Seidel, Gonda & Goldhammer ABSTRACT: A fuselage construction for model aircraft is disclosed, wherein a fuselage is formed by a pair of preformed sheet plastic fuselage shells, edge portions of the shells being coupled together by preformed strip members. The preformed strip members also provide channels for receiving and retaining edges of an internal keel member, the keel member providing an engine mount.

PATENTED JUN22 1971

INVENTOR
LEONARD R. PURDY

BY

Seidel, Gonda & Goldhammer

ATTORNEYS.

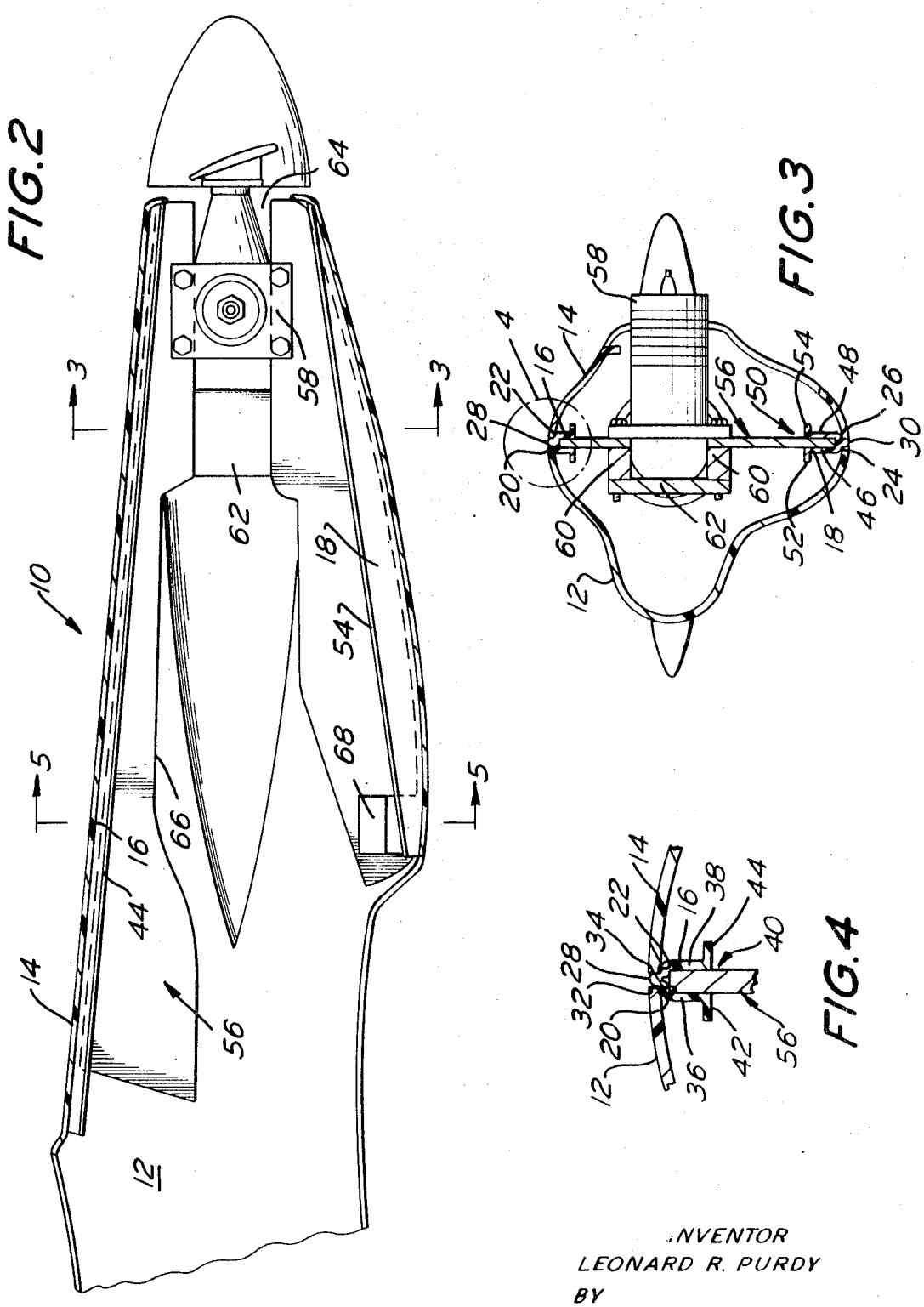

FUSELAGE CONSTRUCTION FOR MODEL AIRCRAFT

This invention relates to a fuselage construction for model aircraft, and more particularly, to a fuselage construction using preformed fuselage-forming shells of sheet plastic polymeric material.

The most commonly used structural material in model aircraft is and has long been wood, usually balsa. Thus, one commonly used form of fuselage construction has employed sheet sheet balsa or plywood sides, separated by transversely extending formers, the top and bottom being provided by strip or sheet balsa planking. Another commonly seen fuselage construction, particularly where sharp bends or compound curves are called for, employs a keel approximating the shape of the fuselage in either side elevation or plan; a series of spaced transversely extending formers glued or otherwise joined to the keel; and an external planking defining the outer contours of the fuselage.

The use of molded plastic resins offers a number of advantages in model aircraft structures. Plastics are readily formed into complex shapes difficult to execute in wood or other traditional materials. They yield a smooth, nonporous skin, ideal for finishing, or having a solid color molded therein. Moreover, some easily moldable plastics are highly impact resistant, and with proper design, can yield strong, light structures, capable of far more rapid assembly than is possible with conventional wood construction.

Accordingly, it is a principle object of this invention to provide a novel fuselage construction for model aircraft, using preformed parts of plastic polymeric material.

Even in plastic fuselage constructions, it is necessary to retain some wooden structure. For example, engine mounts, for reasons of strength and temperature and vibration resistance, are usually made of wood. Wood is also commonly used for landing gear mounts.

Joining of the wooden and plastic parts has heretofore required complex wooden or plastic subassemblies, or else has been accomplished by bedding engine bearers or the structure supporting them in a hardenable-in-place filler, such as commercially available wood-plastic fillers. It is, therefore, another object of this invention to eliminate the need for either of the foregoing engine mount securing techniques, and to provide a simple means whereby an engine mount may be affixed to a plastic fuselage structure.

It is still another object of this invention to provide a fuselage construction having a minimum number of parts, and which is strong and easily constructed.

Other objects will appear hereinafter.

The foregoing and other objects are accomplished, in a presently preferred form of the invention, by providing a pair of preformed sheet plastic fuselage shells, which when coupled together form substantially the complete fuselage. Coupling of the shells is accomplished by bonding their respective edge portions to preformed strip members. Integral with the strip members in the nose section of the fuselage are inwardly directed channel portions, adapted to receive edges of a wooden keel member. Engine bearers and if desired, landing gear mounting blocks, are coupled to the keel member. The edges of the keel member are secured, by glue or the like, to the channel portions.

For the purpose of illustrating the invention, there are shown in the drawings forms which are presently preferred; it being understood, however, that this invention is not limited to the precise arrangements and instrumentalities shown.

FIG. 2 is a cross-sectional view taken along the line 2–2 in FIG. 1.

FIG. 3 is a cross-sectional view taken along the line 3–3 in FIG. 2.

FIG. 4 is a partial cross-sectional view, taken along the line 4 in FIG. 3.

Figure 1:
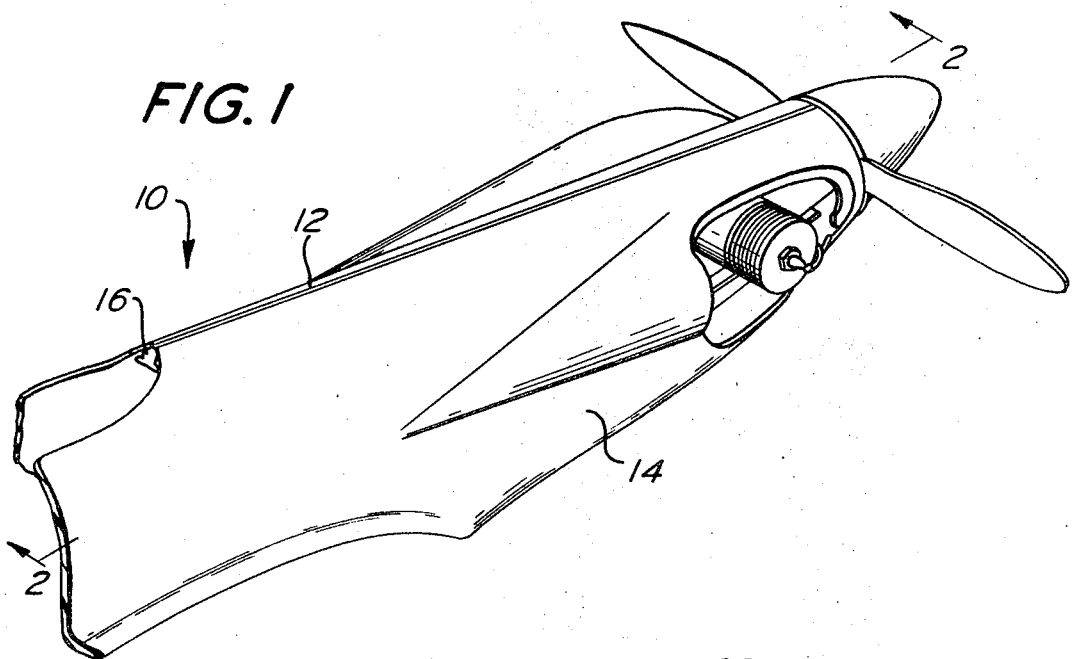
FIG. 1 is a perspective view showing a portion of a fuselage constructed in accordance with the present invention.

REferring now to the drawings in detail, wherein like numerals indicate like elements, there is seen in FIG. 1, the forward part of a fuselage, designated generally by the reference numeral 10, constructed in accordance with the principles of the present invention. The fuselage 10 includes preformed sheet plastic shells 12 and 14, which in the illustrated embodiment define left and right halves of the fuselage 10.

Figure 5:
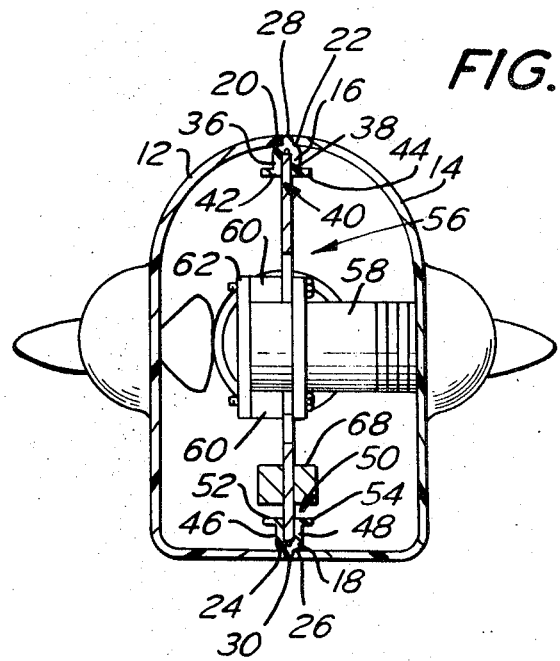
FIG. 5 is a cross-sectional view taken along the line 5–5 of FIG. 2.

As is perhaps best seen in FIGS. 3 and 5, juxtaposed edge portions of the shells 12 and 14 are interconnected by longitudinally extending preformed plastic strip members 16 and 18.

As is apparent from FIGS. 3, 4 and 5, the strip member 16 includes shoulder portions 20, and 22, which receive the edge portions of the shells 12 and 14. A raised bead portion 28 is disposed between the shoulder portions 20 and 22. Similarily, a raised bead portion 30 is disposed between shoulder portions 24 and 26 on the strip member 18. In the assembled fuselage 10, therefore, the bead portions 28 and 30 are disposed between respective edge faces of the shells 12 and 14, and form portions of the external surface of the fuselage 10. Referring to FIG. 4 in particular, it is seen that the bead portion 28 is disposed between edge faces 32 and 34 of the shells 12 and 14, respectively.

Referring again to FIGS. 3, 4 and 5, it is seen that the strip member 16 includes a pair of spaced web members 36 and 38, defining therebetween a channel portion, designated generally by the reference numeral 40. Flange portion 42 and 44 extend outwardly from the web members 36, and serve to rigidly the strip member 16.

Referring now to FIGS. 3 and 5, it is seen that the strip member 18 has a cross-sectional configuration similar to the above-described configuration of the strip member 16. Thus, the strip member 28 includes web members 46 and 48, defining a channel 50 therebetween, and also outwardly directed flange portions 52 and 54.

The channels 40 and 50 of the strip members 16 and 18 are juxtaposed to receive opposite edge portions of a keel member, designated generally by the reference numeral 56. The edge portions of the keel member 56 are preferably bonded, by epoxy for example, to the strip members 16 and 18. The keel member 56 provides an internal reinforcement for the shells 12 and 14.

The keel member 56 also provides a means for mounting an engine 58 in the fuselage 10. For this purpose, the keel member 56 is provided with a pair of engine bearers 60, seen in FIGS. 3 and 5, adapted to receive engine mounting bolts. In the illustrated form of the keel member 56, web portions 62 and 64 interconnect the engine bearers 60.

The shells 12 and 14 may be formed of any suitable plastic polymeric material, such as ABS, which provides a suitable degree of impact and temperature resistance. The material can be shaped in any known manner, such as by vacuum forming or between male and female dies. The strip member 16 and 18 are preferably made from the same material as the shells 12 and 14, and may be formed by extrusion or any other suitable and well-known process.

The shells 12 and 14 can be bonded to the strip members 16 and 18 by well-known techniques. For example, if the shells 12 and 14 and strip members 16 and 18 are made of the same materials, bonding can be accomplished by the application of solvent to soften the portion to be joined, and then applying pressure to the joint until evaporation of the solvent.

Figure 6:
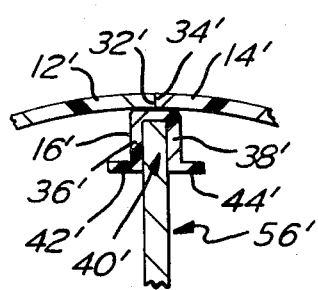
FIG. 6 is a partial cross-sectional view, similar to FIG. 4, showing an alternative embodiment of the invention.

Referring to FIG. 6, there is seen an alternative embodiment, wherein elements corresponding to those previously described are designated by like primed reference numerals.

In FIG. 6, the strip member 16' is provided. The strip member 16', however, does not include a bead portion. Thus, the shoulder portion 20' of the strip member 16' forms a continuous surface across the width of the strip member 16'. In this embodiment, therefore, the edge faces 32' and 34' of the respective shells 12' and 14' are in juxtaposed and abutting relation. The edge portions of the shells 12' and 14' are bonded to the strip member 16', as formerly.

The strip member 16' includes web members 36' and 38', and also flange portions 42' and 44', the web members 36' and 38' providing a channel 40' for receiving a keel member 56'. The function of the strip member 16', therefore, is precisely the same as that of the strip member 16', except that it lacks the advantage of positive self-positioning with respect to the shells, inherent in the strip members 16 and 18 due to presence of the bead portions 28 and 30.

Referring once again to FIG. 2, those skilled in the art will appreciate that the keel member 56 may readily be provided with an opening 66 for receiving a fuel tank, now shown, as well as mounting blocks 68 suitable for receiving landing gear, also not shown.

The present invention may be embodied in other specific forms without departing from the spirit or essential attributes thereof and, accordingly, reference should be made to the appended claims, rather than to the foregoing specification as indicating the scope of the invention.

I claim:

1. A fuselage for model aircraft, comprising a pair of preformed sheet plastic fuselage shells, said shells having longitudinally extending edge portions thereof juxtaposed when said shells are in assembled relation, preformed strip members coupled to said edge portions of said shells to maintain said shells in assembled relation, and a keel member disposed within said shells and coupled to said strip members.

2. A fuselage in accordance with claim 1, wherein said strip members include channel portions disposed within said shells when said shells are in assembled relation, the channel portions of said strip members being in spaced juxtaposed relation, and said keel member having edge portions thereof received in said juxtaposed channel portions and maintained in alignment thereby.

3. A fuselage in accordance with claim 2, wherein said edge portions of said keel member are bonded to said channel portions.

4. A fuselage in accordance with claim 3, wherein said strip members include shoulder portions adapted to receive said edge portions of said shell, and a longitudinally extending raised bead portion between said shoulder portions, said bead portion being disposed between respective edge faces on said shells, and forming a portion of the external surface of said fuselage.

5. A fuselage in accordance with claim 3, wherein said strip members are preformed of sheet plastic material and include shoulder portions adapted to receive said edge portions of said shells, and a longitudinally extending raised bead portion extending between respective edge faces of said shells and forming a portion of the exterior surface of said fuselage, and said strip members including flange portions extending outwardly from said channel portions in a direction generally parallel to said shoulder portions.

6. A fuselage in accordance with claim 1, wherein said keel member includes an engine mount.

7. A fuselage in accordance with claim 5, wherein said keel member includes an engine mount.